Figure 1:
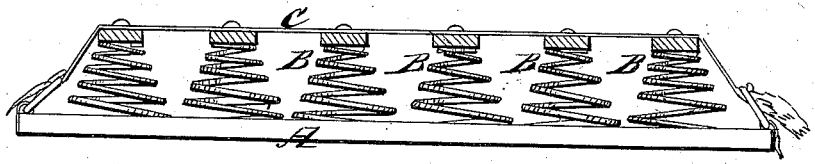
Figure 2:
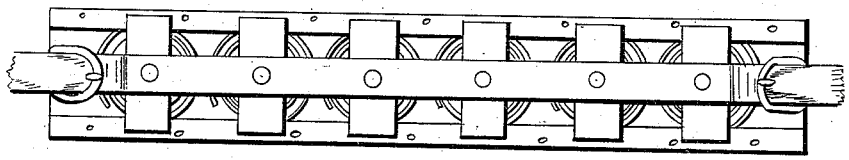
Figure 3:

Flanders & Wells,
Bed Bottom,
No. 70,330. Patented Oct. 29, 1867.

United States Patent Office.

JOHN P. FLANDERS AND SIDNEY K. WELLS, OF BURLINGTON, VERMONT.

Letters Patent No. 70,330, dated October 29, 1867.

IMPROVED BED-BOTTOM.

*The Schedule referred to in these Letters Patent and making part of the same.*

TO ALL WHOM IT MAY CONCERN:

Be it known that we, JOHN P. FLANDERS and SIDNEY K. WELLS, of Burlington, in the county of Chittenden, and in the State of Vermont, have invented certain new and useful improvements in Bed-Bottoms; and we do hereby declare that the following is a full, clear, and exact description thereof, reference being had to the accompanying drawings, and to the letters of reference marked thereon.

In the annexed drawings, making part of this specification, A represents the slat of a bed-bottom, upon which the springs rest. B B represent the springs, which are the usual conical spiral springs used for this purpose. C represents a strap connecting the upper ends of the springs. Upon the upper side of the slat A are secured two strips, $e\ e$. Said strips run longitudinally of the slat, and near its edges. $d\ d$ represent two strips, which are wider than strips $e\ e$, and which are secured upon said strips $e$, with their inner edges projecting as seen, so as to form a groove in connection with the slat A. The bottom coils of the springs are caught in the grooves thus formed by the strips $d$, and are thus held securely in their places. The strips not only serve to confine the lower ends of the springs in their places, but enable them to be slid or adjusted in any desirable manner upon the slat.

Having thus fully described our invention, what we claim as new, and desire to secure by Letters Patent, is—

The slat A, with grooves formed upon its upper side, substantially as herein represented, for the purpose of securing the bottoms of the springs, as is herein fully set forth.

In testimony that we claim the foregoing we have hereunto set our hands and seals this 6th day of September, 1867.

J. P. FLANDERS, [L. S.]
S. K. WELLS. [L. S.]

Witnesses:
    T. E. WALES,
    E. W. TAFT.